Figure 1:
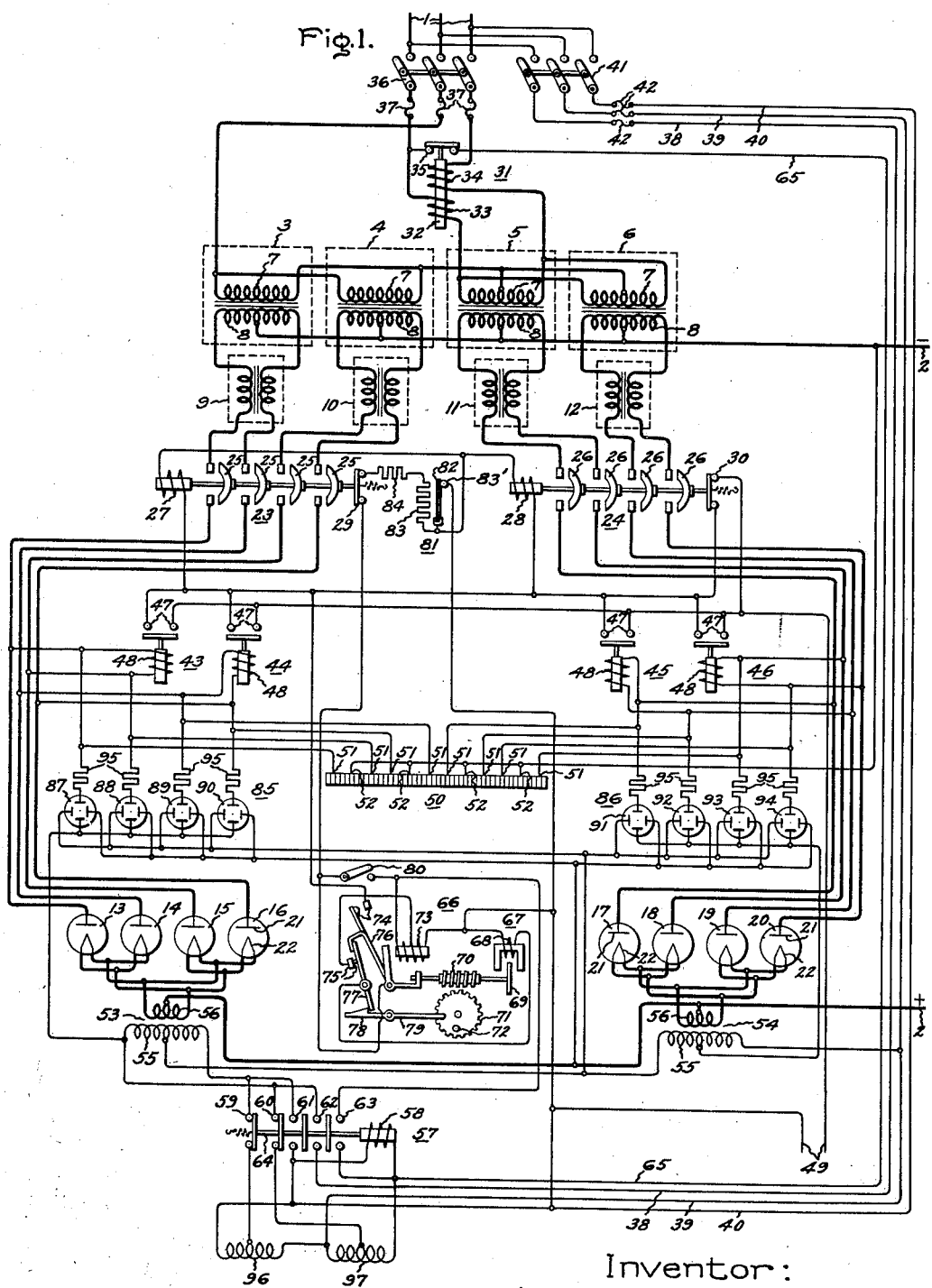

April 23, 1940.    A. SCHMIDT, JR    2,198,486
ELECTRIC VALVE CONTROL SYSTEM
Filed Sept. 14, 1938    2 Sheets-Sheet 1

Inventor:
August Schmidt, Jr.,
by Harry E. Dunham
His Attorney.

April 23, 1940.  A. SCHMIDT, JR  2,198,486

ELECTRIC VALVE CONTROL SYSTEM

Filed Sept. 14, 1938  2 Sheets-Sheet 2

Inventor:
August Schmidt, Jr.,
by Harry E. Dunham
His Attorney.

Patented Apr. 23, 1940

2,198,486

UNITED STATES PATENT OFFICE 2,198,486

ELECTRIC VALVE CONTROL SYSTEM

August Schmidt, Jr., Schenectady, N. Y., assignor to General Electric Company, a corporation of New York Application September 14, 1938, Serial No. 229,924

13 Claims. (Cl. 175—363)

My invention relates to electric valve systems and more particularly to control and protective systems for electric valve translating apparatus.

In electric valve translating apparatus it is frequently desirable to provide control and indicating circuits which control associated apparatus or afford an indication when the translating apparatus departs from a predetermined desired mode of operation. Where the electric valve translating apparatus is designed to transmit a relatively large amount of power and the amount of power transmitted is commensurate with the rating of the equipment, it is important that the attendant be informed when the electric valve means or associated equipment becomes defective. For example, in electric valve translating apparatus employing a plurality of electric valves, the failure of one of the electric valves may impose a heavy load on the remaining valves, thereby jeopardizing the equipment and involving a possibility of failure of service. In accordance with the teachings of my invention described hereinafter, I provide new and improved control and indicating systems for electric valve translating apparatus whereby an operator or an attendant is informed of the irregular operation of the system.

It is an object of my invention to provide new and improved electric valve translating apparatus.

It is another object of my invention to provide a new and improved electric valve circuit.

It is a further object of my invention to provide a new and improved control system for electric valve translating apparatus.

It is a still further object of my invention to provide a new and improved control or indicating system for electric valve translating apparatus.

In accordance with the illustrated embodiments of my invention, I provide new and improved control or indicating system for electric valve translating apparatus for transmitting energy between a load circuit and an alternating current supply circuit. The translating apparatus comprises two parallel circuits or systems each of which is energized from the alternating current supply circuit, and each of which includes a bank of Scott-connected or T-connected transformers for transforming three phase alternating current into quarter phase alternating current. The quarter-phase systems operate in parallel to transmit current to the load circuit. Each of the quarter-phase systems includes electric valve means. I provide voltage responsive means which control the energization of a control or indicating circuit in accordance with the potential difference of the anode conductors associated with electric valves which conduct current in a substantially in-phase relationship. When the potential difference exceeds a predetermined value, the voltage responsive means effects energization of the control circuit.

In accordance with another feature of the illustrated embodiments of my invention, I provide circuit-controlling means, such as circuit interrupters, which are connected between the transformer banks and the electric valve means to render selectively operative or inoperative the electric translating apparatus. The circuit controlling means is provided with an actuating or closing coil which is energized a predetermined interval of time after full or operating voltage has been applied to heating elements for the cathodes of the electric valve means. I also provide in a system of this nature an overload relay which is responsive to the current conducted by the respective quarter-phase systems for effecting deenergization of the actuating means of the circuit-controlling means to interrupt the transfer of energy when the load tends to exceed a predetermined value. There is also provided a suitable means, such as a thermal relay, for controlling the maximum consecutive number of closures of the circuit controlling means during an overload condition.

In accordance with a further feature of the illustrated embodiments of my invention, I provide a circuit which affords an indication of the condition of operation of the respective electric valve means. This indicating circuit is connected to employ a suitable visual indicating device, such as a cathode ray valve, to observe operating characteristics of the valves, as for example, the anode-cathode voltages of the electric valve means.

Figure 2:
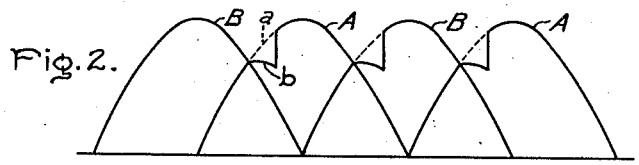
Figure 3:
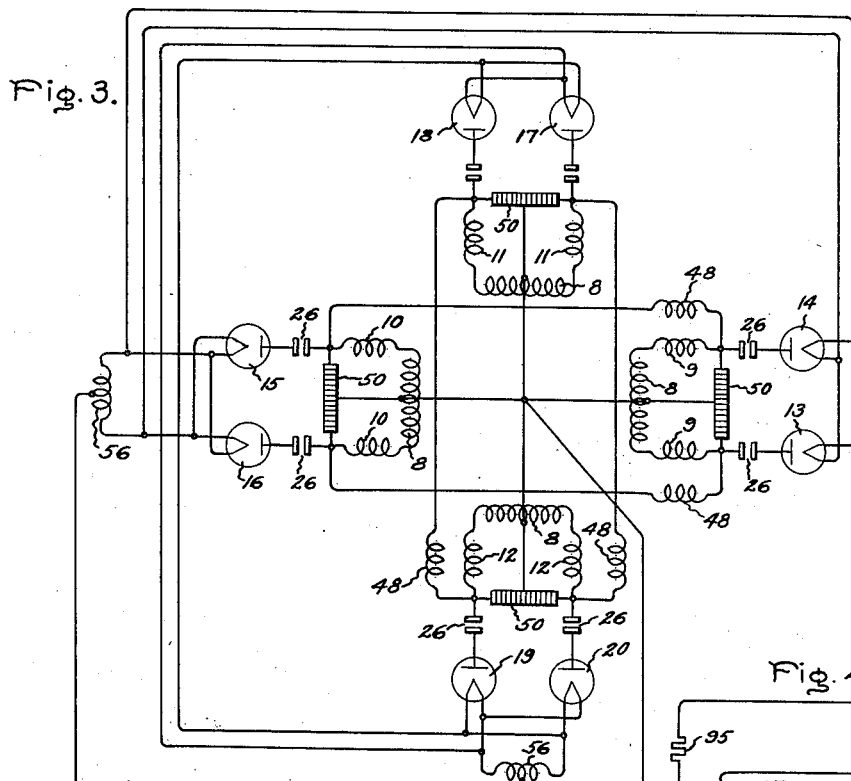
Figure 4:
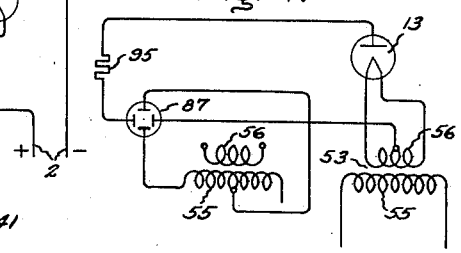
Figure 5:
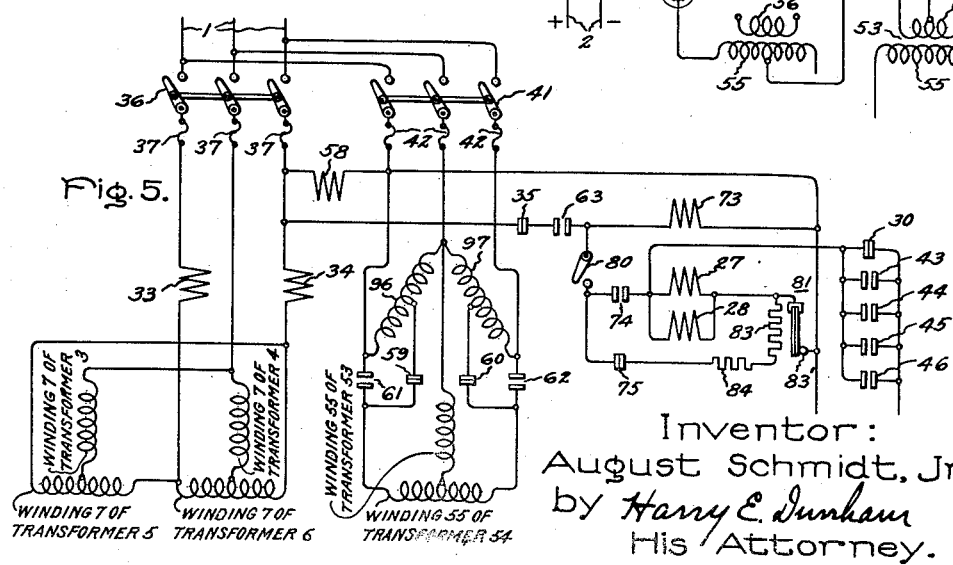

For a better understanding of my invention, reference may be had to the following description taken in connection with the accompanying drawings and its scope will be pointed out in the appended claims. Fig. 1 diagrammatically illustrates an embodiment of my invention as applied to an electric valve translating system for transmitting energy from a three phase alternating current supply circuit to a direct current load circuit, and Fig. 2 represents certain operating characteristics thereof. Fig. 3 is a simplified diagrammatic illustration of the power circuit shown in Fig. 1. Fig. 4 is a simplified diagram of one of the control or indicating circuits of Fig. 1, and Fig. 5 shows a simplified diagram of the principal control circuit of Fig. 1.

Referring now to Fig. 1 of the accompanying drawings, I have diagrammatically illustrated my invention as applied to an electric valve translating system for transmitting energy between a three phase alternating current circuit 1 and a direct current load circuit 2. I provide a pair of quarter-phase systems which operate substantially in parallel and which are energized from the three phase alternating current supply circuit 1 through transformers 3, 4, 5 and 6. Transformers 3 and 5 constitute one Scott-connected transforming arrangement, and transformers 4 and 6 constitute the other Scott or T-connected transforming arrangement. Each of the transformers 3—6 includes a primary winding 7 and a secondary winding 8, the latter of which serve as windings for energizing the electric valve apparatus described hereinafter. I employ a plurality of anode circuit reactors 9—12 which are connected in series relation with the secondary windings 8 of transformers 3—6. I arrange the two quarter-phase alternating current systems in a manner so that there is provided a plurality of pairs of windings having voltages which are substantially in-phase. Electric valves 13—20 are connected to windings 8 through reactors 9—12. The electric valves 13—20 may be of the type employing an ionizable medium, such as a gas or a vapor, and each comprises an anode 21 and a cathode 22. The cathode 22 may be of the thermionic type having a heating element. It will be noted that the anode-cathode voltages of certain pairs of the electric valves are substantially in phase. For example, the voltages supplied to the electric valves 13, 15; 14, 16; 17, 19; and 18, 20 are in phase.

As a suitable circuit-controlling means for initiating operation of the system and for rendering the system inoperative, I provide circuit interrupters 23 and 24. Circuit interrupters 23 and 24 are connected in the anode-cathode circuits or the anode conductor circuits of the systems and render the system operative when in a closed position. Circuit interrupters 23 and 24 comprise sets of power contacts 25 and 26, actuating means such as coils 27 and 28, and control contacts 29 and 30, respectively. The control contacts 29 and 30 serve to effect energization of a control circuit, to be described hereinafter, which controls the maximum consecutive number of closures of the circuit interrupters 23 and 24 during an overload condition.

I provide an overload means, such as a relay 31, which is responsive to the current conducted by the system. The relay 31 may comprise an armature 32, an actuating coil 33 associated with one of the quarter-phase systems, and an actuating coil 34 associated with the other of the quarter-phase systems. The relay 31 is also provided with control contacts 35 which are connected in circuit to be described hereinafter. A suitable circuit-controlling means, such as a switch 36, may be interposed between the alternating current supply circuit 1 and the quarter-phase systems. Current protective means, such as fuses 37, may be connected in series relation with the switch 36, if desired. A control circuit comprising conductors 38, 39 and 40 may be employed to effect energization of the control system. These conductors may be connected to the alternating current supply circuit 1 through a switch 41 and through overload protective means such as fuses 42.

I provide a plurality of voltage responsive means, such as relays 43—46, which are responsive to the voltage difference or the potential difference of the anode conductors or the anode-cathode circuits of the pairs of electric valves which operate substantially in parallel. That is, the relays 43—46 are associated with those anode-cathode circuits in which the voltages are substantially in phase. Each of the relays 43—46 may comprise control contacts 47. When one of the electric valves in each of the respective associated pairs departs from normal operation, the potential difference of the associated anode-cathode circuits attains a predetermined value, effecting energization of the actuating coils 48 of relays 43—46, and effecting energization of a control, indicating, or alarm circuit 49.

As an agency for protecting the transformer windings from over-voltages and controlling the voltages impressed on the actuating coils 48 of relays 43—46 under transient conditions, I provide an impedance element 50 having a plurality of terminals 51 which are connected to the terminals of the actuating coils 48. The impedance element 50 is also provided with a plurality of terminals 52 which are spaced at predetermined intervals and which are connected to one of the terminals of the direct current circuit 2, such as the negative terminal. The impedance element 50 may be of any suitable material having a negative or non-linear impedance-current characteristic, such as the material disclosed and claimed in United States Letters Patent No. 1,822,742, granted September 8, 1931 upon an application of Karl B. McEachron, and assigned to the assignee of the present application.

I provide cathode heating transformers 53 and 54, each having a primary winding 55 and a secondary winding 56. The primary windings 55 are connected to be energized from a switch or relay 57 having an actuating coil 58 and contacts 59—63 and an armature 64. The armature 64 is spring biased to the left-hand position to engage contacts 59 and 60 and thereby to impress on the cathode transformers 53 and 54 a reduced voltage which may be employed to maintain the cathodes of the electric valves 13—20 at a predetermined minimum temperature. Contacts 61—63 when closed impress full or operating voltage on the cathode heating transformers 53 and 54. The lower contact of contacts 63 is connected to contacts 35 of the overload relay 31 through conductor 65.

As a means for delaying the application of voltage to the anode-cathode circuits of the electric valves 13—20 a predetermined time so that the cathodes of these valves may assume a desired minimum operating temperature, I provide a relay 66 which is initiated in its operation upon the closure of contacts 63 of switch 57. The relay 66 includes a motor 67 having an energizing coil 68 and a rotatable disk member 69 which drives a worm gear 70, which in turn engages a gear wheel 71 having mounted thereon a pin 72. The relay 66 also includes a magnet having an energizing coil 73. The relay 66 is also provided with contacts 74 and 75, the former contacts serving to complete the circuit for energization of coils 27 and 28 of circuit interrupters 23 and 24, and the latter contacts control the energization of the energizing coil 68 of the motor 67 of relay 66. The movable contacts of contacts 74 and 75 are carried by armatures 76 and 77, respectively. Armatures 76 and 77 are maintained in the position shown by a latch member 78 having an arm 79 which is engaged by the pin 72 of the gear wheel 71 after a predetermined interval of time established by the setting or adjustment of the relay. When the arm 79 is raised by the pin 72, the armature 76 and hence the armature 77 are raised by the magnet coil 73 to close contacts 74 and to open contacts 75. A switch 80 may be connected in circuit with actuating coils 27 and 28 of circuit breakers 23 and 24 to complete the circuit for the energization of these coils. Of course, the switch 80 is connected in series relation with contacts 74 of relay 66 and hence is not effective to energize coils 27 and 28 until after the lapse of the interval of time determined by the relay 66.

To control the maximum consecutive number of closures of the circuit breakers 23 and 24 under an overload condition, I provide a suitable means such as a thermal relay 81 which may have a bimetallic member 82 and a heating resistance 83. The resistance 83 may be connected in series relation with a current limiting resistance 84. The circuit for energizing the heating resistance 83 includes control contacts 29 and 30 of circuit interrupters 23 and 24 and, of course, the resistance 83 is energized only when the main or power circuit breaker contacts 25 or 26 are in the open circuit position. The contacts 83' of the thermal relay 81 are connected in circuit with the coil 73 of relay 66 to prevent actuation of armatures 76 and 77 when the consecutive number of energizations of the actuating coils 27 and 28 of circuit interrupters 23 and 24 attains a preestablished value. That is, so long as the contacts 83' of relay 81 are open, the coil 73 of relay 66 cannot be energized.

I provide circuits 85 and 86 which may afford an indication of the anode-cathode voltages of electric valves 13—20. The circuits 85 and 86 comprise sockets or receptacles 87—94, inclusive, into which a suitable visual means (not shown), such as a cathode ray oscillograph, may be inserted to observe the anode-cathode voltages of the electric valves. Current limiting resistances 95 may be connected in series relation with the visual indicating means.

Suitable voltage dividing means, such as transformer windings 96 and 97, may be energized from conductors 38—40 to provide a system of voltages of reduced magnitude for supplying a predetermined amount of energy to the cathode heating transformers 53 and 54 when the armature 64 of switch 57 is in the biased position.

The operation of the embodiment of my invention diagrammatically illustrated in Fig. 1 will be explained by considering the system when it is operating to transmit energy from the alternating current supply circuit to the direct current load circuit 2. The two quarter-phase systems comprising transformers 3 and 5, and 4 and 6, operate substantially in parallel. Accordingly, certain pairs of electric valves operate substantially in parallel, or, in other words, the anode-cathode voltages and the anode-cathode circuit currents are substantially in phase. For example, the voltages applied to the anode-cathode circuits of electric valves 13 and 15 are substantially in phase.

Upon closing switches 36 and 41, coil 58 of switch 57 is energized, moving the armature 64 to the right-hand position and closing contacts 61—63. Upon closing contact 63, coil 68 of motor 67 of relay 66 is energized, thereby initiating the timing operation. That is, motor 67 initiates the timing operation to establish the interval of time during which full voltage is applied to the cathode heating transformers 53 and 54 prior to the energization of the actuating coils 27 and 28 of circuit interrupters 23 and 24. Worm gear 70 engages the gear wheel 71, and at the expiration of the predetermined interval of time pin 72 of the gear wheel 71 engages arm 79, moving the latch 78 to release armatures 76 and 77. If the switch 80 has been closed, the coil 73 will move the armatures 76 and 77 so that the contacts 74 are closed and contacts 75 are opened. It is to be understood that the closure of the switch 80 prior to the expiration of the interval of time will not be effective to energize actuating coils 27 and 28 because the armatures 76 and 77 are biased to the position shown. Upon closure of contacts 74, actuating coils 27 and 28 will be energized, effecting closure of circuit breakers 23 and 24. Upon opening of contact 75, the coil 68 of motor 67 will be deenergized to end the timing operation. So long as circuit breakers 23 and 24 are in the closed circuit postion, control contacts 29 and 30 are open and the circuit for the heating resistance 83 is accordingly interrupted.

So long as the system operates in accordance with the desired mode of operation, the control circuit 49 will not be energized. However, if one of the electric valves operates erratically or becomes defective, the associated voltage responsive relay of relays 43—46 effects energization of the control or indicating circuit 49. For example, if electric valve 15 becomes defective, the potential difference of the anode-cathode circuits associated with electric valves 13 and 15 becomes sufficiently large to close contacts 47 of relay 43, completing the circuit for energizing the control circuit 49.

In the event the load transmitted by either or both of the quarter-phase systems exceeds a predetermined value, the overload relay 31 operates to open contacts 35, thereby interrupting the energization of coil 73 of relay 66 and allowing the armatures 76 and 77 to move to the positions shown in the drawings. Upon opening contacts 74, actuating coils 27 and 28 of circuit breakers 23 and 24 are deenergized, opening power contacts 25 and 26. Upon moving to the position shown and effecting closure of contacts 75, the timing operation will be re-initiated due to the energization of coil 68 of motor 67. If the overload has subsided, the above-described operation will be followed to effect closure of circuit breakers 23 and 24. However, if the overload is sustained, the circuit breakers 23 and 24 will be closed a predetermined number of times. The number of consecutive energizations of the actuating coils 27 and 28 under the overload conditions is established by the setting or adjustment of the thermal relay 81. If the overload condition continues for a predetermined time involving the energization of the actuating coils 27 and 28 for a corresponding number of times, the thermal element 82 of relay 81 will operate to open contacts 83', effecting interruption of the circuit for energizing coil 68 of motor 67. In this manner an excessive number of closures of the circuit breakers 23 and 24 under overload conditions is prevented. After a second interval of time determined by the characteristics of the thermal relay 81, the contacts 83' of relay 81 will be closed to reinitiate the timing operation. If the overload condition has disappeared, the circuit breakers 23 and 24 will be closed in the manner described above.

Switch 41 is normally maintained in closed circuit position to apply a reduced voltage to the cathode heating transformers 53 and 54. Upon closing switch 36, the relay 57 is actuated to close switch 57 and to place the circuit in condition for operation. Upon closing switch 80, the timing operation is initiated.

The operating characteristics of Fig. 2 may be referred to in order to explain the manner in which the voltage sensitive relays 43—46 operate. Curves A and B represent the quarter-phase system of voltages applied to certain electric valves as, for example, electric valves 13—16. The sinusoidal portion of curve A represents the voltage impressed on electric valves 13 and 15 when the electric valves are operating normally, and the corresponding portions of curve B represent the anode-neutral voltages of electric valves 14 and 16 when the valves are operating properly. However, if one of the electric valves, as for example electric valve 15, becomes defective, a substantial voltage difference will appear between the anode-cathode circuits for electric valves 13 and 15. The magnitude of this voltage may be represented by the difference between portion *a* and portion *b*. This voltage difference is sufficient to actuate the voltage responsive relay 43 to effect energization of circuit 49.

The manner in which the circuits 85 and 86 may be used for observing the operating characteristics of the electric valves 13—20 will now be considered. Suitable visual indicating or observing apparatus, such as a cathode ray oscillograph, may be inserted in the receptacles or sockets 87 to 94 to observe the anode-cathode voltages of the electric valves 13—20. The voltages supplied to the sockets 87—94 are, of course, correlated in phase with respect to the voltages applied to the electric valves 13—20.

Fig. 3 is a simplified diagram of the power circuit shown in Fig. 1, and corresponding elements have been assigned like reference numerals. The operation of the circuit of Fig. 3 may be explained by reference to the operation described in connection with Fig. 1.

Fig. 4 is a simplified diagram of one element, such as the socket or receptacle 87 associated with the power electric valve 13. It will be noted that the voltage supplied to the socket 87 is the anode-cathode voltage of the electric valve 13 and that by inserting a visual indicating device, such as a cathode ray oscillograph, into the socket 87, certain operating characteristics of the electric valve 13 may be observed.

Fig. 5 shows a portion of the power circuit, namely, windings 7 of transformers 3—6, and portions of the control circuit shown in Fig. 1. In view of the description of the operation appearing above in connection with the Fig. 1, it is believed that the operation of the circuit of Fig. 5 will be selfevident.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current circuit, a second circuit, electric valve translating apparatus connected between said circuits and including a plurality of anode circuits, said translating apparatus being arranged to have at least two anode circuits at substantially the same potential during normal operation, a third circuit, and means responsive to the difference in potential of said normally equal potential anode circuits for energizing said third circuit when said translating apparatus departs from normal operation.

2. In combination, an alternating current circuit, a second circuit, electric translating apparatus connected between said circuits and including a plurality of windings and electric valve means connected between said windings and said load circuit, said windings being arranged so that at least two of said windings furnish voltages substantially in phase, a third circuit, and means responsive to the difference of potential of said two windings for controlling said third circuit.

3. In combination, an alternating current circuit, a load circuit, electric valve translating apparatus connected between said circuits and comprising a plurality of anode conductors, said translating apparatus being connected so that at least two of said anode conductors are at substantially the same potential during normal operation, a control circuit, and means responsive to the difference in potential of said last mentioned conductors for effecting energization of said control circuit when said potential difference attains a predetermined value.

4. In combination, a three-phase alternating current supply circuit, a load circuit, electric translating apparatus connected between said circuits and comprising two pairs of Scott-connected transformers having their primary windings energized in parallel relation from said supply circuit and electric valve means connected between said transformers and said load circuit, means connected between said transformers and said electric valve means to control the voltage supplied to said electric valve means, and means responsive to the difference in voltage applied to the respective associated electric valves.

5. In combination, an alternating current circuit, a load circuit, electric translating apparatus connected between said circuits and comprising transforming apparatus connected to said alternating current circuit and electric valve means, circuit controlling means connected between said transforming apparatus and said electric valve means, actuating means for said circuit controlling means, time delay means for effecting energization of said actuating means a predetermined time after the occurrence of a controlling operation, and means responsive to the current transmitted by said translating apparatus for effecting deenergization of said actuating means when the current transmitted attains a predetermined value.

6. In combination, an alternating current circuit, a load circuit, electric translating apparatus connected between said circuits and comprising transforming apparatus connected to said alternating current circuit and electric valve means, circuit controlling apparatus connected between said transforming apparatus and said electric valve means, actuating means for said circuit controlling apparatus, means for energizing said actuating means, means responsive to the current transmitted by said translating apparatus for effecting deenergization of said actuating means when the current transmitted tends to exceed a predetermined value, time delay means for effecting energization of said actuating means a predetermined time after the occurrence of a controlling operation, and means to control the number of consecutive times which the time delay means effects closure of said circuit controlling apparatus.

7. In combination, an alternating current circuit, a load circuit, electric translating apparatus connected between said circuits and including a plurality of windings and electric valve means, said electric valve means having anode-cathode circuits connected to said windings, said windings being arranged so that pairs of windings have voltages substantially in phase, a plurality of voltage responsive relays each associated with a different one of said pairs of windings and a circuit connected to be controlled by said relays.

8. In combination, an alternating current circuit, a load circuit, electric translating apparatus connected between said circuits and including a plurality of windings and electric valve means, said electric valve means having anode-cathode circuits connected to said windings, said windings being arranged so that pairs of said windings have voltages substantially in phase, a plurality of voltage responsive relays each associated with a different one of said pairs and each having an actuating winding, and an impedance element having a nonlinear impedance-current characteristic connected across said actuating windings.

9. In combination, an alternating current circuit, a direct current load circuit, electric translating apparatus connected between said circuits and including a plurality of windings and electric valve means, said electric valve means having anode-cathode circuits connected to said windings, said windings being arranged so that pairs of said windings have voltages substantially in phase, a plurality of voltage responsive relays each associated with a different one of said pairs and each having an actuating winding, and an impedance element having a plurality of spaced terminals connected to one terminal of said load circuit and having other terminals connected across the actuating coils of said relays.

10. In combination, an alternating current circuit, a load circuit, electric translating apparatus connected between said circuits and comprising a plurality of windings and electric valve means, said electric valve means having an anode and a cathode, said windings being arranged so that predetermined pairs of windings have voltages substantially in phase, and means connected to be responsive to the difference of the anode-cathode voltages of said electric valve means to determine the condition of operation of said electric valve means.

11. In combination, an alternating current circuit, a load circuit, electric translating apparatus interconnecting said circuits and comprising a plurality of windings and a plurality of electric valve means each having an anode, a cathode and a heating element for said cathode, circuit controlling means connected between said windings and said electric valve means, actuating means for said circuit controlling means, means for energizing said actuating means to initiate operation of said translating apparatus, means for supplying a predetermined minimum amount of energy to the cathode heating elements prior to the energization of said actuating means, means for increasing the amount of energy supplied to said cathode heating elements, and means for delaying the energization of said actuating means for a predetermined interval of time after the operation of said last mentioned means.

12. In combination, a three-phase alternating current circuit, a direct current circuit, electric translating apparatus connected between said circuits and comprising a pair of quarter-phase alternating current circuits each including a Scott-connected transforming means, an electric valve means and a circuit controlling means, and means for controlling said circuit controlling means in accordance with the current conducted by said translating apparatus.

13. In combination, a three-phase alternating current circuit, a direct current circuit, electric translating apparatus connected between said circuits and comprising a pair of quarter-phase alternating current circuits each including a Scott-connected transforming means, an electric valve means and a circuit controlling means, and means responsive to the currents conducted by each of said quarter-phase circuits for controlling said circuit controlling means.

AUGUST SCHMIDT, JR.